US006782363B2

(12) United States Patent
Lee et al.

(10) Patent No.: US 6,782,363 B2
(45) Date of Patent: Aug. 24, 2004

(54) METHOD AND APPARATUS FOR PERFORMING REAL-TIME ENDPOINT DETECTION IN AUTOMATIC SPEECH RECOGNITION

(75) Inventors: Chin-Hui Lee, Basking Ridge, NJ (US); Qi P. Li, New Providence, NJ (US); Jinsong Zheng, Edison, NJ (US); Qiru Zhou, Scotch Plains, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 313 days.

(21) Appl. No.: 09/848,897

(22) Filed: May 4, 2001

(65) Prior Publication Data

US 2002/0184017 A1 Dec. 5, 2002

(51) Int. Cl.[7] .................................................. G10L 15/00

(52) U.S. Cl. ........................ 704/248; 704/233; 704/210; 704/215; 704/253

(58) Field of Search .................................. 704/210, 215, 704/233, 248, 253, 249, 250, 254, 255, 208, 214

(56) References Cited

U.S. PATENT DOCUMENTS

RE32,172 E * 6/1986 Johnston et al. ............ 704/253
6,480,823 B1 * 11/2002 Zhao et al. ................. 704/226

OTHER PUBLICATIONS

Li, Q. et al., "A Matched Filter Approach To Endpoint Detection For Robust Speaker Verification", *IEEE Workshop of Automatic Identification*, Summit, NJ (1999).

Chengalvarayan, R. "Robust Energy Normalization Using Speech/Nonspeech Discriminator For German Connected Digit Recognition", *Proceedings of Eurospeech '99*, pp. 61–64 (1999).

Bullington, K. et al. "Engineering Aspects of TASI", *Bell Syst. Tech. Journal*, pp. 353–364 (1959).

Wilpon, J. G. et al., "An Improved Word–Detection Algorithm for Telephone– Quality Speech Incorporating Both Syntactic and Semantic Constraints", *AT&T Bell Laboratories Technical Journal*, vol. 63, No. 3, pp. 479–499 (1984).

Rabiner, L.R. et al., "An Algorithm for Determining the endpoints of Isolated Utterances", *The Bell System Tech. Journal*, vol. 54, pp. 297–315 (1975).

Lamel, L.F. et al., "An Improved Endpoint Detector for Isolated Word Recognition", *IEEE Transactions on Acoustics, Speech, and signal Processing*, vol. ASSP–29, No. 4, pp. 777–785 (1981).

Tanyer, S. G. et al., "Voice Activity Detection in Nonstationary Noise", *IEEE Transactions on Speech and Audio Processing*, vol. 8, No. 4, pp. 478–482 (2000).

Canny, J. "A Computational Approach to Edge Detection", *IEEE Transactions on Pattern Analysis And Machine Intelligence*, vol. PAMI–8, No. 6, pp. 679–698 (1986).

Petrou, M. et al., "Optimal Edge Detectors for Ramp Edges", *IEEE Transactions on Pattern Analysis and Machine Intelligence*, vol. 13, No. 5, pp. 483–491 (1991).

* cited by examiner

*Primary Examiner*—Vijay Chawan
(74) *Attorney, Agent, or Firm*—Kenneth M. Brown

(57) ABSTRACT

A method and apparatus for performing real-time endpoint detection for use in automatic speech recognition. A filter is applied to the input speech signal and the filter output is then evaluated with use of a state transition diagram (i.e., a finite state machine). The filter is advantageously designed in light of several criteria in order to increase the accuracy and robustness of detection. The state transition diagram advantageously has three states. The endpoints which are detected may then be advantageously applied to the problem of energy normalization of the speech portion of the signal.

28 Claims, 4 Drawing Sheets

METHOD AND APPARATUS FOR PERFORMING REAL-TIME ENDPOINT DETECTION IN AUTOMATIC SPEECH RECOGNITION

FIELD OF THE INVENTION

The present invention relates generally to the field of automatic speech recognition, and more particularly to a method and apparatus for locating speech within a speech signal (i.e., "endpoint detection").

BACKGROUND OF THE INVENTION

When performing automatic speech recognition (ASR) on an input signal, it must be assumed that the signal may contain not only speech, but also periods of silence and/or background noise. The detection of the presence of speech embedded in a signal which may also contain various types of non-speech events such as background noise is referred to as "endpoint detection" (or, alternatively, speech detection or voice activity detection). In particular, if both the beginning point and the ending point of the actual speech (jointly referred to as the speech "endpoints") can be determined, the ASR process may be performed more efficiently and more accurately. For purposes of continuous-time ASR, endpoint detection must be correspondingly performed as a continuous-time process which necessitates a relatively short time delay.

On the other hand, batch-mode endpoint detection is a one-time process which may be advantageously used, for example, on recorded data, and has been advantageously applied to the problem of speaker verification. One approach to batch-mode endpoint detection is described in "A Matched Filter Approach to Endpoint Detection for Robust Speaker Verification," by Q. Li et al., IEEE Workshop of Automatic Identification, October 1999.

As is well known to those skilled in the art, accurate endpoint detection is crucial to the ASR process because it can dramatically affect a system's performance in terms of recognition accuracy and speed for a number of reasons. First, cepstral mean subtraction (CMS), a popular algorithm used in many robust speech recognition systems and fully familiar to those of ordinary skill in the art, needs an accurate determination of the speech endpoints to ensure that its computation of mean values is accurate. Second, if silence frames (i.e., frames which do not contain any speech) can be successfully removed prior to performing speech recognition, the accumulated utterance likelihood scores will be focused exclusively on the speech portion of an utterance and not on both noise and speech. For each of these reasons, a more accurate endpoint detection has the potential to significantly increase the recognition accuracy.

In addition, it is quite difficult to model noise and silence accurately. Although such modeling has been attempted in many prior art speech recognition systems, this inherent difficulty can lead not only to less accurate recognition performance, but to quite complex system implementations as well. The need to model noise and silence can be advantageously eliminated by fully removing such frames (i.e., portions of the signal) in advance. Moreover, one can significantly reduce the required computation time by removing these non-speech frames prior to processing. This latter advantage can be crucial to the performance of embedded ASR systems, such as, for example, those which might be found in wireless phones, because the processing power of such systems are often quite limited.

For these reasons, the ability to accurately detect the speech endpoints within a signal can be invaluable in speech recognition applications. Where speech is contained in a signal which otherwise contains only silence, the endpoint detection problem is quite simple. However, common non-speech events and background noise in real-world signals complicate the endpoint detection problem considerably. For example, the endpoints of the speech are often obscured by various artifacts such as clicks, pops, heavy breathing, or dial tones. Similar types of artifacts and background noise may also be introduced by long-distance telephone transmission systems. In order to determine speech endpoints accurately, speech must be accurately distinguishable from all of these artifacts and background noise.

In recent years, as wireless, hands-free, and IP (Internet packet-based) phones have become increasingly popular, the endpoint detection problem has become even more challenging, since the signal-to-noise ratios (SNR) of these forms of communication devices are often quite a bit lower than the SNRs of traditional telephone lines and handsets. And as pointed out above, the noise can come from the background—such as from an automobile, from room reflection, from street noise or from other people talking in the background—or from the communication system itself—such as may be introduced by data coding, transmission, and/or Internet packet loss. In each of these adverse acoustic environments, ASR performance, even for systems which work reasonably well in non-adverse acoustic environments (e.g., traditional telephone lines), often degrades dramatically due to unreliable endpoint detection.

Another problem which is related to real-time endpoint detection is real-time energy feature normalization. As is fully familiar to those of ordinary skill in the art, ASR systems typically use speech energy as the "feature" upon which recognition is based. However, this feature is usually normalized such that the largest energy level in a given utterance is close to or slightly below a known constant level (e.g., zero). Although this is a relatively simple task in batch-mode processing, it can be a difficult problem in real-time processing since it is not easy to estimate the maximal energy level in an utterance given only a short time window, especially when the acoustic environment itself is changing.

Clearly, in continuous-time ASR applications, a look-ahead approach to the energy normalization problem is required—but, in any event, accurate energy normalization becomes especially difficult in adverse acoustic environments. However, it is well known that real-time energy normalization and real-time endpoint detection are actually quite related problems, since the more accurately the endpoints can be detected, the more accurately energy normalization can be performed.

The problem of endpoint detection has been studied for several decades and many heuristic approaches have been employed for use in various applications. In recent years, however, and especially as ASR has found significantly increased application in hands-free, wireless, IP phone, and other adverse environments, the problem has become more difficult—as pointed out above, the input speech in these situations is often characterized by a very low SNR. In these situations, therefore, conventional approaches to endpoint detection and energy normalization often fail and the ASR performance often degrades dramatically as a result.

Therefore, an improved method of real-time endpoint detection is needed, particularly for use in these adverse environments. Specifically, it would be highly desirable to devise a method of real-time endpoint detection which (a) detects speech endpoints with a high degree of accuracy and does so at various noise levels; (b) operates with a relatively low computational complexity and a relatively fast response time; and (c) may be realized with a relatively simple implementation.

SUMMARY OF THE INVENTION

In accordance with the principles of the present invention, real-time endpoint detection for use in automatic speech recognition is performed by first applying a specified filter to a selected feature of the input signal, and then evaluating the filter output with use of a state transition diagram (i.e., a finite state machine). In accordance with one illustrative embodiment of the invention, the selected feature is the one-dimensional short-term energy in the cepstral feature, and the filter may have been advantageously designed in light of several criteria in order to increase the accuracy and robustness of detection. More particularly, in accordance with the illustrative embodiment, the use of the filter advantageously identifies all possible endpoints, and the application of the state transition diagram makes the final decisions as to where the actual endpoints of the speech are likely to be. Also in accordance with the illustrative embodiment, the state transition diagram advantageously has three states and operates based on a comparison of the filter output values with a pair of thresholds. The endpoints which are detected may then be advantageously applied to the problem of energy normalization of the speech portion of the signal.

DETAILED DESCRIPTION

Overview

Figure 1:
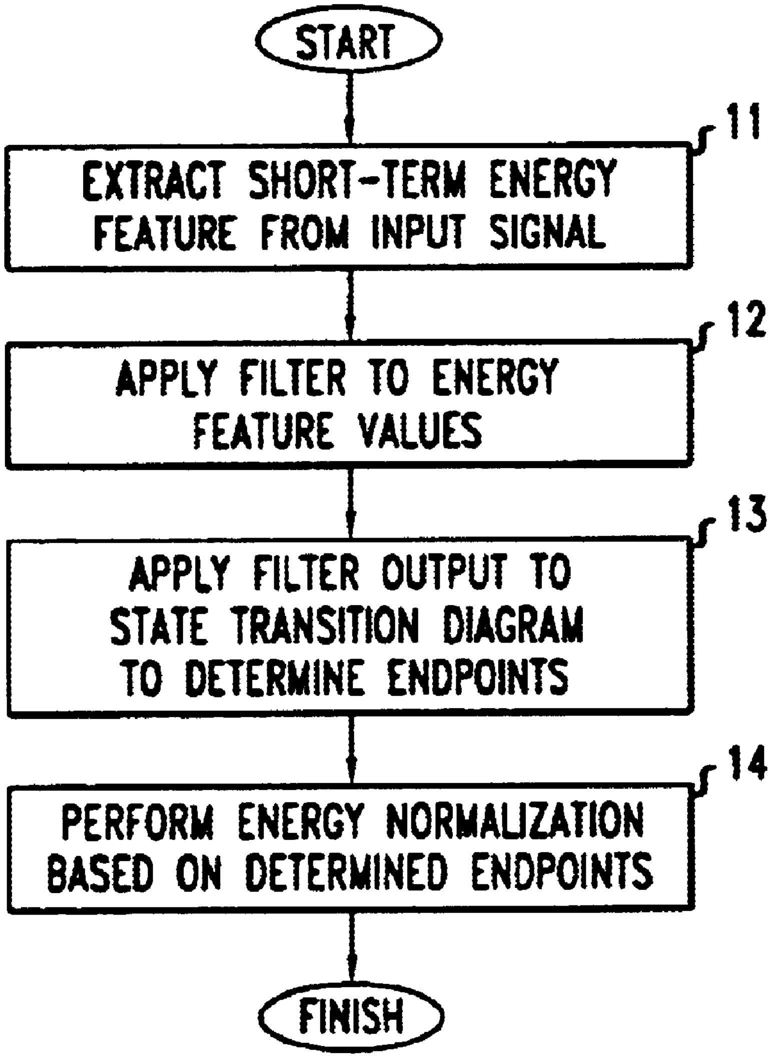
FIG. 1 shows a flowchart of a method for performing real-time endpoint detection and energy normalization for automatic speech recognition in accordance with an illustrative embodiment of the present invention.

FIG. 1 shows a flowchart of a method for performing real-time endpoint detection and energy normalization for automatic speech recognition in accordance with an illustrative embodiment of the present invention. The method operates on an input signal which includes one or more speech signal portions containing speech utterances as well as one or more speech signal portions containing periods of silence and/or background noise. Illustratively, the input signal sampling rate may be 8 kilohertz.

The first step in the illustrative method of FIG. 1, as shown in block 11 of the flowchart, extracts the one-dimensional short-term energy in dB from the cepstral feature of the input signal, so that the energy feature may be advantageously used as the basis for performing endpoint detection. (The one-dimensional short-term energy feature and the cepstral feature are each fully familiar to those skilled in the art.) Then, as shown in block 12 of the flowchart, a predefined moving-average filter is applied to a predefined window on the sequence of energy feature values. This filter advantageously detects all possible endpoints based on the given window of energy feature values.

Next, as shown in block 13 of the flowchart, the output values of the filter are compared to a set of predetermined thresholds, and the results of these comparisons are applied to a three-state transition diagram, to determine the speech endpoints. The three states of the state transition diagram may, for example, advantageously represent a "silence" state, an "in-speech" state, and a "leaving speech" state. Finally, as shown in block 14 of the flowchart, the detected endpoints may be advantageously used to perform improved energy normalization by estimating the maximal energy level within the speech utterance.

More specifically, the illustrative method for performing real-time endpoint detection and energy normalization for automatic speech recognition in accordance with the illustrative embodiment of the present invention shown in FIG. 1 operates as follows. As pointed out above, and in order to advantageously achieve a low complexity, we use the one-dimensional short-term energy in the cepstral feature as the feature for endpoint detection in accordance with:

$$g(t) = 10\log_{10} \sum_{j=n_t}^{n_t+I-1} o(j)^2 \tag{1}$$

where t is a frame number of the feature, o(j) is a voice data sample, $n_t$ is the number of the first data sample in the window for the energy computation, I is the window length, and g(t) is in units of dB. Thus, the detected endpoints can be advantageously aligned to the ASR feature automatically, and the computation can be reduced to the feature frame rate instead of to the high speech sampling rate of o(j).

To achieve accurate and robust endpoint detection in accordance with the principles of the present invention, we first advantageously apply a filter to the energy feature values which has been designed to detect all possible endpoints, and then apply a 3-state decision logic (i.e., state transition diagram or finite state machine) which has been designed to produce final, reliable decisions as to endpoint detection. Assume that one utterance may have several voice segments separated by possible pauses. Each of these segments can be determined by detecting a pair of endpoints representing segment "beginning" and "ending" points, respectively.

Illustrative Filter Design

In accordance with an illustrative embodiment of the present invention, a filter is designed which advantageously meets the following criteria:

(i) invariant outputs at various background energy levels;

(ii) the capability of detecting both beginning and ending points;

(iii) limited length or short lookahead;

(iv) maximum output SNR at endpoints;

(v) accurate location of detected endpoints; and (vi) maximum suppression of false detection.

Specifically, assume that the beginning edge in the energy level is a ramp edge that can be modeled by the function:

$$c(x) = \begin{cases} 1 - e^{-sx}/2 & \text{for } x \ge 0 \\ e^{sx}/2 & \text{for } x \le 0 \end{cases} \quad (2)$$

where s is some positive constant. We consider the problem of finding a filter profile $f(x)$ which advantageously maximizes a mathematical representation of criteria (iv), (v), and (vi) above. The criteria and the boundary conditions for solving the profile are described in detail below. (See subsection entitled "Details of the illustrative filter design profile solution".) One advantageous solution for the filter profile, which also advantageously satisfies criterion (i) above, is:

$$f(x)=e^{Ax}[K_1 \sin(Ax)+K_2 \cos(Ax)]+e^{-Ax}[K_3 \sin(Ax)+K_4 \cos(Ax)]+K_5+K_6e^{sx} \quad (3)$$

where A and $K_i$ are filter parameters. Since $f(x)$ is only one half of the filter from −w to zero, the complete function of the filter for the edge detection may be specified as:

$$h(i)=\{-f(-w \leqq i \leqq 0), f(1 \leqq i \leqq w)\} \quad (4)$$

In order to satisfy criteria (ib.) and (iii) as specified above, and to have reliable responses to both beginning and ending points, we advantageously choose w=14 and then compute s=0.5385 and A=0.2208. Other filter parameters may be advantageously chosen to be: $K_1 \ldots K_6$={1.583, 1.468, −0.078, −0.036, −0.872, −0.56}.

Figure 2:
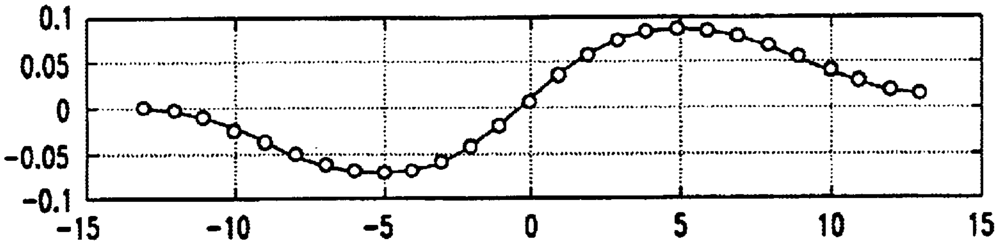
FIG. 2 shows a graphical profile of an illustrative filter designed for use in the illustrative method for performing real-time endpoint detection and energy normalization for automatic speech recognition as shown in FIG. 1.

The profile of this designed filter is shown in FIG. 2 with a simple normalization, h/13. Note that it can be seen from this profile that the filter response will advantageously be positive to a beginning edge, negative to an ending edge, and near zero to silence. Note also that the response is advantageously (essentially) invariant to background noise at different energy levels, since they all have near zero responses. For real-time endpoint detection, let H(i)=h(i−13), and the filter advantageously has a 24-frame lookahead, thus meeting all six of the above criteria. Specifically, the filter advantageously operates as a moving-average filter in accordance with:

$$F(t) = \sum_{i=2}^{W=24} H(i)g(t+i-2) \quad (5)$$

where g(.) is the energy feature and t is the current frame number. Note that both H(1) and H (25) are equal to zero.

Illustrative State Transition Diagram

Figure 3:
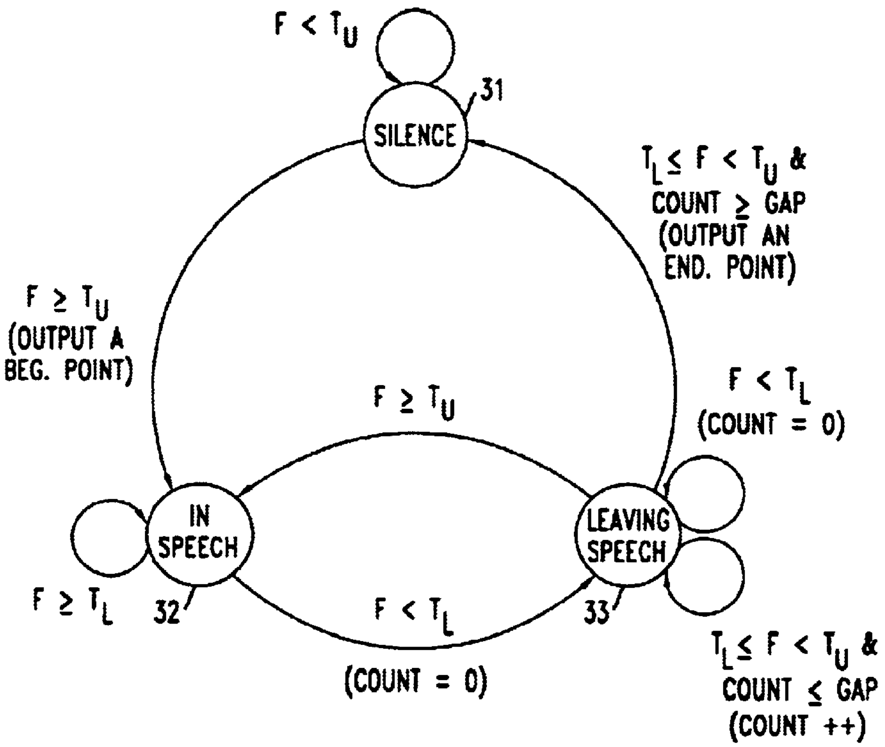
FIG. 3 shows an illustrative state transition diagram for use in the illustrative method for performing real-time endpoint detection and energy normalization for automatic speech recognition as shown in FIG. 1.

In accordance with an illustrative embodiment of the present invention, the output of the filter F(t) is evaluated with use of a state transition diagram (i.e., state machine) for final endpoint decisions. Specifically, FIG. 3 shows an illustrative state transition diagram for use in the illustrative method for performing real-time endpoint detection and energy normalization for automatic speech recognition as shown in FIG. 1. As shown in the figure, the diagram has three states, identified and referred to as "silence" state 31, "in-speech" state 32, and "leaving-speech" state 33, respectively. Either silence state 31 or in-speech state 32 can be used as a starting state, and any state can be a final state. Advantageously, we assume herein that silence state 31 is the starting state.

The input to the illustrative state diagram is F(t), and the output is the detected frame numbers of beginning and ending points. The transition conditions are labeled on the edge between states (as is conventional), and the actions are listed in parentheses. The variable "Count" is a frame counter, $T_L$ and $T_U$ are a pair of thresholds, and the variable "Gap" is an integer indicating the required number of frames from a detected endpoint to the actual end of speech. In accordance with the illustrative embodiment of the present invention described herein, the two thresholds may be advantageously set as $T_U$=3.6 and $T_L$=−3.0.

The operation of the illustrative state diagram is as follows: First, suppose that the state diagram is in the silence state, and that frame t of the input signal is being processed. The illustrative endpoint detector first compares the filter output F(t) with an upper threshold $T_U$. If $F(t) \geqq T_U$, the illustrative detector reports a beginning point, moves to the in-speech state, and sets a beginning point flag Bpt=1 and an ending-point flag Ept=0; if, on the other hand, $F(t)<T_U$, the illustrative detector remains in the silence state and sets these flags to Bpt=1 and Ept=0, respectively.

When the detector is in the in-speech state, and when $F(t)<T_L$, it means that a possible ending point is detected. Thus, the detector then moves to the leaving-speech state, sets flag Ept=1, and initializes a time counter, Count=0. If, on the other hand, $F(t) \geqq T_L$, the detector remains in the in-speech state.

When in the leaving-speech state, if $T_L \leqq F(t) < T_U$, the detector adds 1 to the counter; if $F(t)<T_L$, it resets the counter, Count=0; and if $F(t) \geqq T_U$, it returns to the in-speech state. Moreover, if the value of the counter, Count, is greater than or equal to a predetermined value, Gap, i.e., Count≧Gap, an ending point is determined, and the detector then moves to the silence state. (Illustratively, the predetermined value Gap=30.) If at the last energy point E(T), if the detector is in the leaving-speech state, the last point T will also advantageously be specified as an ending point.

Figure 4:
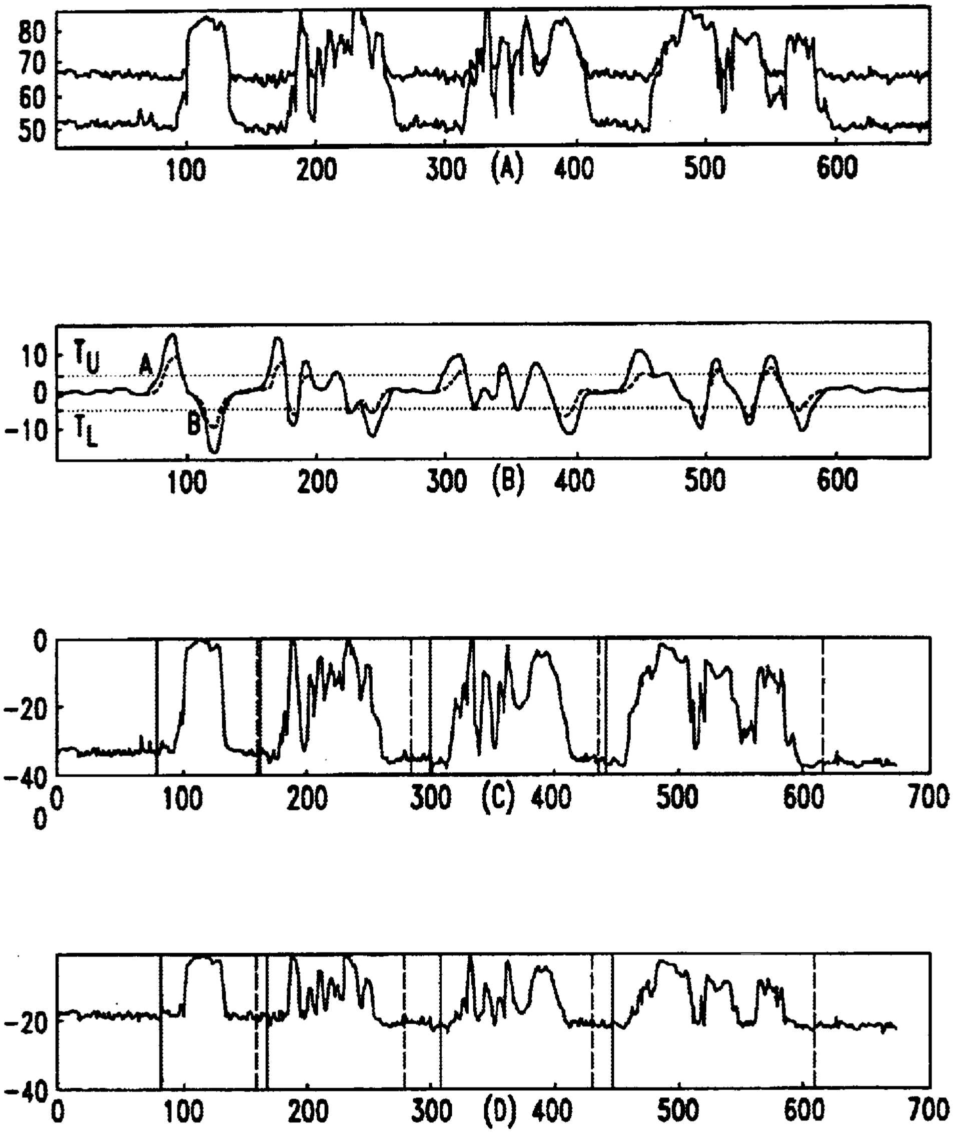
FIG. 4A shows a graph of energy features from an illustrative speech signal both with and without added background noise.
FIG. 4B shows the output of the illustrative filter as shown in FIG. 2, when each of the illustrative speech signals of FIG. 4A are applied thereto.
FIG. 4C shows the detected endpoints and normalized energy for the illustrative speech signal of FIG. 4A without the added background noise in accordance with the illustrative method shown in FIG. 1.
FIG. 4D shows the detected endpoints and normalized energy for the illustrative speech signal of FIG. 4A with the added background noise in accordance with the illustrative method shown in FIG. 1.

FIG. 4 may be used as an example to further illustrate the operation of the state transition diagram. Specifically, FIG. 4A shows a graph of energy features from an illustrative speech signal both with and without added background noise; FIG. 4B shows the output of the illustrative filter as shown in FIG. 2, when each of the illustrative speech signals of FIG. 4A are applied thereto; FIG. 4C shows the detected endpoints and normalized energy (see discussion below) for the illustrative speech signal of FIG. 4A without the added background noise in accordance with the illustrative method shown in FIG. 1; and FIG. 4D shows the detected endpoints and normalized energy (see discussion below) for the illustrative speech signal of FIG. 4A with the added background noise in accordance with the illustrative method shown in FIG. 1.

Note that the raw energy is shown in FIG. 4A as the bottom line, and the filter output is shown in FIG. 4B as the solid line. When applied to the sample signal of FIG. 4, the illustrative state diagram of FIG. 3 will stay in the silence state until F(t) reaches point A in FIG. 4B, where the fact that $F(t) \geqq T_U$ indicates that a beginning point has been detected. The resultant actions are to output a beginning point indication (illustratively shown as the left vertical solid line in FIG. 4C), and to move to the in-speech state. The state diagram then advantageously remains in the in-speech sate until reaching point B in FIG. 4B, where $F(t)<T_L$. The state diagram then moves to the leaving-speech state and sets the counter, Count=0. After remaining in the leaving-speech state for Gap=30 frames, an actual endpoint is detected and the state diagram advantageously moves back to the silence state at point C (illustratively shown as the left vertical dashed line in FIG. 4C).

Illustrative Real-Time Energy Normalization

Suppose the maximal energy value in an utterance is $g_{max}$. As explained above, energy normalization is advantageously performed in order to normalize the utterance energy g(t), such that the largest value of the energy is close to zero, by performing $\tilde{g}(t)=g(t)-g_{max}$. Since ASR is being performed in real-time, it is necessary to estimate the maximal energy $g_{max}$ sequentially, simultaneous to the data collection itself. Thus, the estimated maximum energy becomes a variable, i.e., $\hat{g}_{max}(t)$. Nevertheless, in accordance with an illustrative embodiment of the present invention, the detected endpoints may be advantageously used to perform a better estimation.

Specifically, we first initialize the maximal energy to a constant $g_0$, and use this value for normalization until we detect the first beginning point A, i.e., $\hat{g}_{max}(t)=g_0$, $\forall t<A$. If the average energy:

$$\bar{g}(t)=E\{g(t);\ A\leqq t<A+W\}\geqq g_m, \quad (6)$$

where $g_m$ is a predetermined threshold, we then estimate the maximal energy as:

$$\hat{g}_{max}(t)=\max\{g(t);\ A\leqq t<A+W\}, \quad (7)$$

where W=25 is the length of the filter. From this point on, we then update $\hat{g}_{max}(t)$ as:

$$\hat{g}_{max}(t)=\max\{g(t+W-1),\ \hat{g}_{max}(t-1);\ \forall t>A\}. \quad (8)$$

Illustratively, $g_0$=80.0 and $g_m$=60.0.

For the example in FIG. 4, the energy features of two utterances—one with a 20 dB SNR (shown on the bottom) and one with a 5 dB SNR (shown on the top) are plotted in FIG. 4A. The 5 dB SNR utterance may be generated by artificially adding background noise (such as, for example, car noise) to the 20 dB SNR utterance. The corresponding filter outputs are shown in FIG. 4B—for the 20 dB SNR utterance as the solid line, and for the 5 dB SNR utterance as the dashed line, respectively. The detected endpoints and normalized energy for the 20 dB SNR utterance and for the 5 dB SNR utterance are plotted in FIG. 4C and FIG. 4D, respectively. Note that the filter outputs for the two cases are almost invariant around $T_L$ and $T_U$, even though their background energy levels have a 15 dB difference. Also note that the normalized energy profiles are almost the same. Finally, note also that any and all of the above parameters, such as, for example, $T_L$, $T_U$, Gap, $g_0$ and $g_m$, may be adjusted according to signal conditions in different applications.

Details of the Illustrative Filter Design Profile Solution

The following analysis is based in part on the teachings of "Optimal Edge Detectors for Ramp Edges," by M. Petrou et al., IEEE Trans. On Pattern Analysis and Machine Intelligence, vol. 13, pp. 483–491, May 1991 (hereinafter, "Petrou and Kittler"). In particular, assume that the beginning or ending edge in log energy is a ramp edge, as is fully familiar to those of ordinary skill in the art. And, assume that the edges are emerged with white Gaussian noise. Petrou and Kittler derived the signal to noise ratio (SNR) for the filter $f(x)$ as being proportional to:

$$S=\frac{\int_{-w}^{0} f(x)(1-e^{sx})dx}{\sqrt{\int_{-w}^{0}|f(x)|^2dx}}. \quad (9)$$

They consider a good locality measure to be inversely proportional to the standard deviation of the distribution of endpoint where the edge is supposed to be. It was defined as $$L=\frac{s^2\int_{-w}^{0} f(x)e^{sx}dx}{\sqrt{\int_{-w}^{0}|f'(x)|^2dx}} \quad (10)$$

Finally, the measure for the suppression of false edges is proportional to the mean distance between the neighboring maximum of the response of the filter to white Gaussian noise, $$C=\frac{1}{w}\sqrt{\frac{\int_{-w}^{0}|f'(x)|^2dx}{\int_{-w}^{0}|f''(x)|^2dx}} \quad (11)$$

Therefore, the combined performance measure of the filter is defined in Petrou and Kittler as:

$$\begin{aligned} J &= (S\cdot L\cdot C)^2 \quad (12)\\ &= \frac{s^4}{w^2}\frac{\left|\int_{-w}^{0} f(x)(1-e^{sx})dx\int_{-w}^{0} f(x)e^{sx}dx\right|^2}{\int_{-w}^{0}|f(x)|^2dx\int_{-w}^{0}|f''(x)|^2dx}\end{aligned}$$

The problem now is to find a function $f(x)$ which maximizes the criterion J and satisfies the following boundary conditions:

(i) it must be antisymmetric, i.e., $f(x)=-f(-x)$, and thus $f(0)=0$. This follows from the fact that we want it to detect antisymmetric features and to have near zero responses to any background noise levels—i.e., to be invariant to background noise;

(ii) it must be of finite extent going smoothly to zero at its ends: $f(\pm w)=0$, $f'(\pm w)=0$ and $f(x)=0$ for $|x|\geqq w$, where w is the half width of the filter; and (iii) it must have a given maximum amplitude $|k|$: $f(x_m)=k$ where $x_m$ is defined by $f'(x_m)=0$ and $x_m$ is in the interval (−w, 0).

The problem has been solved in Petrou and Kittler and the function of the optimal filter is as shown in Equation (3) above.

Addendum to the Detailed Description

It should be noted that all of the preceding discussion merely illustrates the general principles of the invention. It will be appreciated that those skilled in the art will be able to devise various other arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future—i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the figures, including functional blocks labeled as "processors" or "modules" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof any element expressed as a means for performing a specified function is intended to encompass any way of performing that function including, for example, (a) a combination of circuit elements which performs that function or (b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent (within the meaning of that term as used in 35 U.S.C. 112, paragraph 6) to those explicitly shown and described herein.

We claim:

1. A method for performing real-time endpoint detection for use in automatic speech recognition applied to an input signal, the method comprising the steps of:

- extracting one or more features from said input signal to generate a sequence of extracted feature values;
- applying a filter to said sequence of extracted feature values to generate a sequence of filter output values, said filter comprising an edge detecting filter and said filter output values indicative of whether an edge is present in said sequence of extracted feature values; and
- applying a state transition diagram to said sequence of filter output values to identify endpoints within said input signal.

2. The method of claim 1 wherein said one or more features comprise cepstral features.

3. The method of claim 2 wherein said one or more features comprises a one-dimensional short-term energy feature.

4. The method of claim 1 wherein said filter comprises a moving-average filter applied to a predetermined window of said sequence of said extracted feature values.

5. The method of claim 4 wherein said filter comprises a filter having a profile of the form:

$$f(x)=e^{Ax}[K_i \sin(Ax)+K_2 \cos(Ax)]+e^{-Ax}[K_3 \sin(Ax)+K_4 \cos(Ax)]+K_5+K_6e^{sx}$$

where s, A, and $K_i$, for i=1, . . . 6, are each filter parameters.

6. The method of claim 5 wherein said filter parameters are set approximately to s=0.5385; A=0.2208; and $K_1$ . . . $K_6$={1.583, 1.468, −0.078, −0.036, −0.872, −0.56}.

7. The method of claim 4 wherein said predetermined window is of a size approximately equal to 25.

8. The method of claim 1 wherein said state transition diagram has at least three states.

9. The method of claim 8 wherein said at least three states include a silence state, an in-speech state and a leaving-speech state.

10. The method of claim 1 wherein one or more transitions of said state transition diagram operates based on a comparison of one of said filter output values with one or more predetermined thresholds.

11. The method of claim 10 wherein said one or more thresholds comprise a lower threshold and an upper threshold.

12. The method of claim 11 wherein said state transition diagram has at least three states including a silence state, an in-speech state and a leaving-speech state, and wherein one or more transitions originating from the leaving-speech state operates based on a count of number of a frames which have elapsed since said leaving-speech state was last entered.

13. The method of claim 1 wherein said identified endpoints comprise speech beginning points and speech ending points.

14. The method of claim 1 further comprising the step of performing real-time energy normalization on said input signal based on said identified endpoints.

15. An apparatus for performing real-time endpoint detection for use in automatic speech recognition applied to an input signal, the apparatus comprising:

- means for extracting one or more features from said input signal to generate a sequence of extracted feature values;
- a filter applied to said sequence of extracted feature values which generates a sequence of filter output values, said filter comprising an edge detecting filter and said filter output values indicative of whether an edge is present in said sequence of extracted feature values; and
- a state transition diagram applied to said sequence of filter output values which identifies endpoints within said input signal.

16. The apparatus of claim 15 wherein said one or more features comprise cepstral features.

17. The apparatus of claim 16 wherein said one or more features comprises a one-dimensional short-term energy feature.

18. The apparatus of claim 15 wherein said filter comprises a moving-average filter and is applied to a predetermined window of said sequence of said extracted feature values.

19. The apparatus of claim 18 wherein said filter comprises a filter having a profile of the form:

$$f(x)=e^{Ax}[K_i \sin(Ax)+K_2 \cos(Ax)]+e^{-Ax}[K_3 \sin(Ax)+K_4 \cos(Ax)]+K_5+K_6e^{sx}$$

where s, A, and $K_i$, for i=1, . . . 6, are each filter parameters.

20. The apparatus of claim 19 wherein said filter parameters are set approximately to s=0.5385; A=0.2208; and $K_1$ . . . $K_6$={1.583, 1.468, –0.078, –0.036, –0.872, –0.56}.

21. The apparatus of claim 18 wherein said predetermined window is of a size approximately equal to 25.

22. The apparatus of claim 15 wherein said state transition diagram has at least three states.

23. The apparatus of claim 22 wherein said at least three states include a silence state, an in-speech state and a leaving-speech state.

24. The apparatus of claim 15 wherein one or more transitions of said state transition diagram operates based on a comparison of one of said filter output values with one or more predetermined thresholds.

25. The apparatus of claim 24 wherein said one or more thresholds comprise a lower threshold and an upper threshold.

26. The apparatus of claim 25 wherein said state transition diagram has at least three states including a silence state, an in-speech state and a leaving-speech state, and wherein one or more transitions originating from the leaving-speech state operates based on a count of a number of frames which have elapsed since said leaving-speech state was last entered.

27. The apparatus of claim 15 wherein said identified endpoints comprise speech beginning points and speech ending points.

28. The apparatus of claim 15 further comprising means for performing real-time energy normalization on said input signal based on said identified endpoints.

* * * * *